Feb. 24, 1948.  W. E. URSCHEL ET AL  2,436,410
ADJUSTABLE CASING FOR ROTARY DRUM TYPE
FRUIT AND VEGETABLE DICING MACHINES
Filed Dec. 17, 1942  2 Sheets-Sheet 1
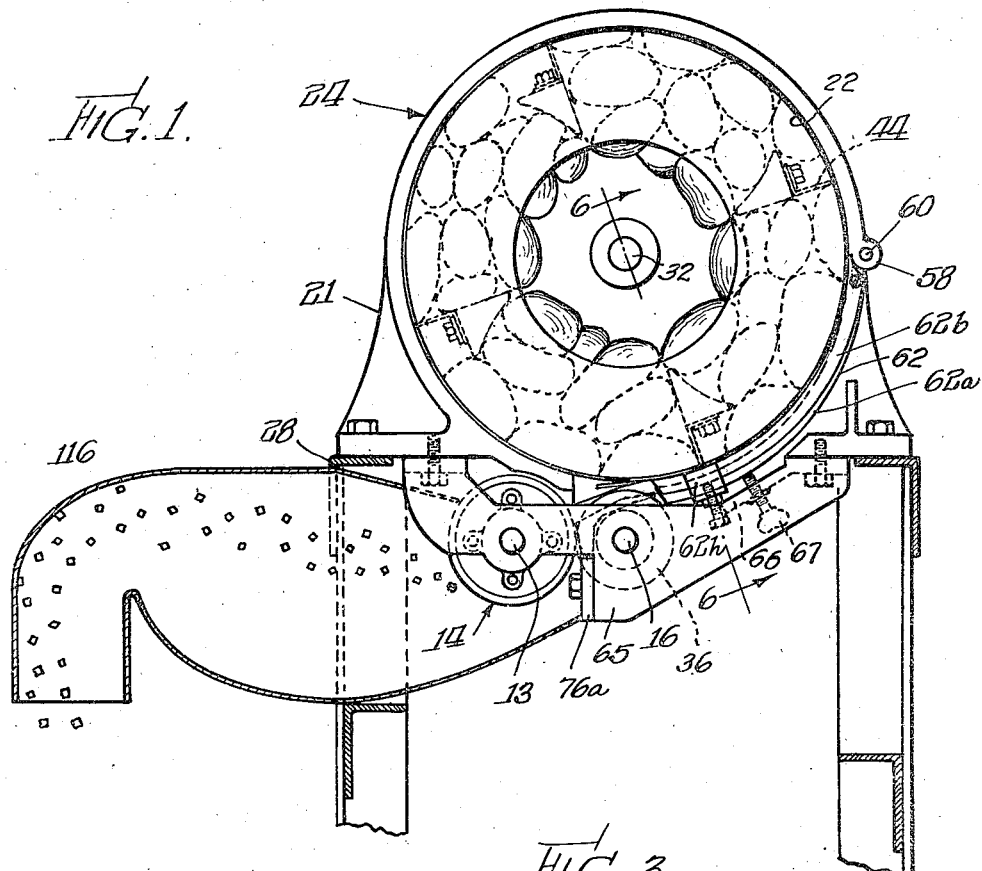
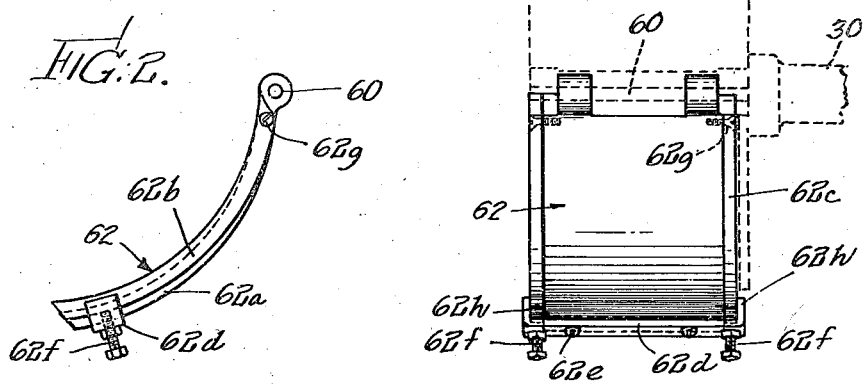
INVENTORS.
William E. Urschel
BY: Joe Richard Urschel
Loftus, Moore, Olson & Trexler
ATTORNEYS.

Feb. 24, 1948.  W. E. URSCHEL ET AL  2,436,410
ADJUSTABLE CASING FOR ROTARY DRUM TYPE
FRUIT AND VEGETABLE DICING MACHINES
Filed Dec. 17, 1942   2 Sheets-Sheet 2
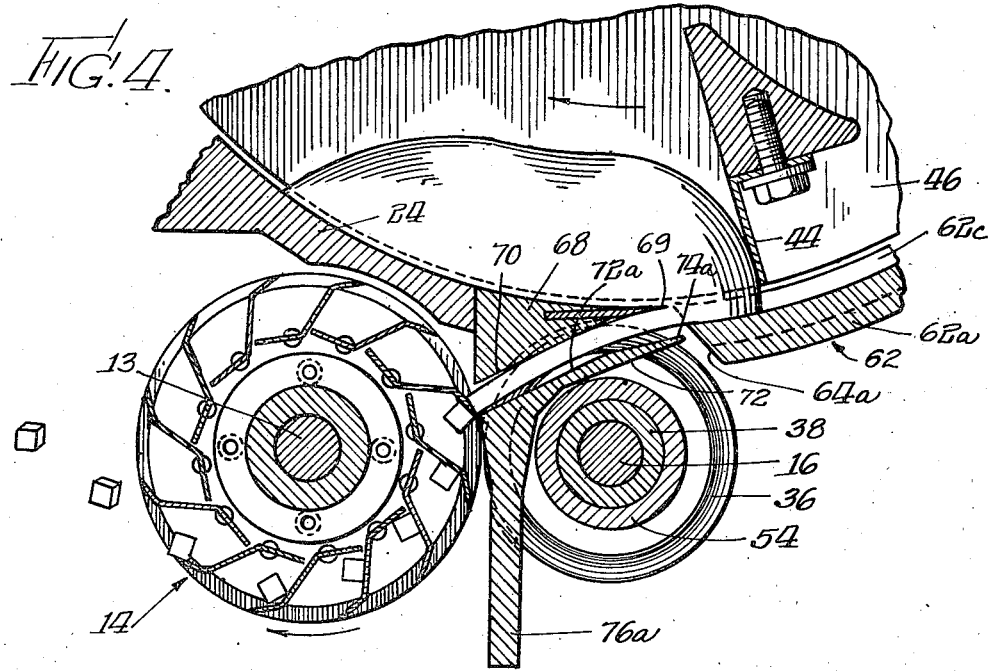
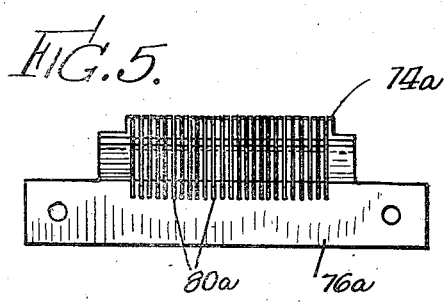
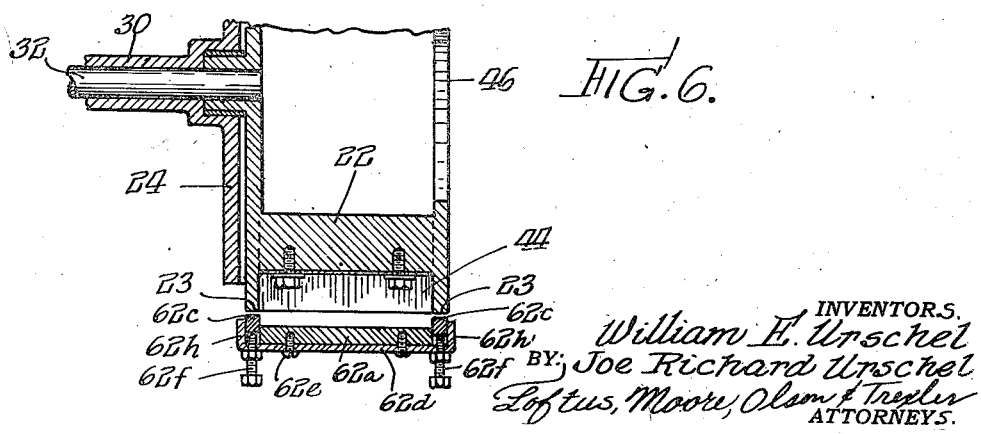
INVENTORS.
William E. Urschel
BY Joe Richard Urschel
Loftus, Moore, Olsen & Trexler
ATTORNEYS.

Patented Feb. 24, 1948

2,436,410

UNITED STATES PATENT OFFICE 2,436,410

ADJUSTABLE CASING FOR ROTARY DRUM TYPE FRUIT AND VEGETABLE DICING MACHINES

William E. Urschel and Joe Richard Urschel, Valparaiso, Ind.

Application December 17, 1942, Serial No. 469,276

7 Claims. (Cl. 146—164)

1

This invention relates to improvements in vegetable and fruit dicing machines.

The invention is particularly illustrated as pertaining to improvements in the dicing machine disclosed and claimed in our prior Patent No. 2,242,557, issued May 20, 1941, although certain features of the invention are adaptable to other forms of the invention than that disclosed in our prior patent.

One of the objects of the present invention is to prevent the wastage of cut food at the slicing station of the construction shown in our prior patent, and more particularly to prevent the projection of food outwardly through the space between the periphery of the rotating drum and the inner walls of the swingable arcuate section located opposite the slicing knife. In our prior patent there is an opening between the periphery 46 of the rotating drum 22 and the hinged arcuate portion 62, such as that shown at 64 in Figure 5 of our prior patent. This opening, which begins at the hinge 60, widens progressively until at the lower end of this arcuate section the opening between the periphery 46 of the rotating drum 22 and the arcuate section 62 is the same width as the thickness of the slice being cut by the slicing knife. Due to the centrifugal force of a quantity of fruit or vegetable within the drum, portions of the fruit or vegetable are forced into the space between the arcuate section 62 and the periphery 46 of the rotating drum so that when these portions are carried against the slicing knife holder such portions are mangled and forced laterally out of the machine onto the floor. Therefore, one of the objects of the present invention is to eliminate such a waste by providing an improved arcuate portion whereby the space between the arcuate portion and the periphery of the rotating drum is at all times maintained to proper running clearance regardless of the thickness of the slice.

Yet another object of the present invention is to improve the construction of the machine of the foregoing patent to such an extent that it can dice such vegetables as onions, cabbages, or any fruits or vegetables which do not make a solid slice on the first cut. When vegetables and fruits of this type were sliced by the first slicing knife of the former machine, the slices tended to fall into short segments and these segments packed between the circular strip cutting knives, such as 36 of said patent, and the inner end 74 of the shear plate, and clogged up the machine. These small pieces formed a wedge-shaped mass between the hub 54 of the circular knife spindle

2 and the slicing knife spindle and the slicing knife holder. This wedge-shaped mass could not pass through to the shearing edge of the shear plate and thus prevented new slices from passing beyond the slicing knife and through the rotary strip cutting knives. Hence one of the objects of the present invention is to provide a new and improved shear plate which is formed with a ledge which extends between the rotary strip cutting knives to a position confronting and adjacent the lower end of the adjustable swinging arcuate portion 62, whereby to provide a continuous guideway for the formed slice, and particularly short pieces. This construction provides a positive guide for the slice and eliminates all clogging of the machine.

These and other objects of the invention will be apparent from a perusal of the following specification when taken in connection with the accompanying drawings, wherein:

Figure 1 is a vertical sectional view of the improvements as applied to the machine;

Figure 2 is a side view of the new arcuate section;

Figure 3 is a rear view of the arcuate section;

Figure 4 is a fragmentary sectional view showing the shear plate and the rotary slicing knives;

Figure 5 is a side view of the improved shear plate; and

Figure 6 is a fragmentary view in section taken on the line 6—6 of Figure 1.

Referring now to the drawings in detail, and particularly to Figure 1 thereof, we shall refer only to those parts of our prior Patent 2,242,557 as are sufficient to illustrate the invention herein claimed. Suffice it to say that the dicing machine comprises any type of pedestal upon which is mounted a stationary housing 24, which is bolted to the support. This housing, as shown in our prior patent, is provided at one end with a stationary hopper having an open top adapted to receive the substance to be diced, such as potatoes, fruits or vegetables, and this hopper has an open mouth adapted to discharge into a parallel open register of a rotatable drum 22 mounted within the stationary housing 24. Particular reference is made to Figure 2 of our prior patent to show the manner in which this rotatable drum is driven from any suitable prime mover, through the intermediary of the shaft 32. The shaft 32 has splined thereto the drum-like member 22. This drum-like member in turn is provided with internal inwardly projecting abutments, there being four shown, which on rotation of the drum 22 when the same is filled with potatoes or other fruit or vegetable substances are centrifuged about the parallel axis 32. The periphery of the drum as at 46 is open except at the pusher elements 44 where the potatoes or other substances centrifuged within the drum slide continuously and freely about the inner smooth wall of the stationary casing 24. Disposed below a stationary slicing knife 69 hereinafter referred to, and preferably below the same, are a plurality of parallel disposed spaced apart disc cutting knives 36. To this end, a shaft 16 is provided with a sleeve 38. The construction and operation of this shaft, the sleeve and the disc knives are fully described and set forth in our prior Patent 2,242,557. One portion of the peripheral wall of the casing 24 is provided with a hinge 58 for the reception of a pin 60 which hinges an arcuate portion 62 whereby the free end 64a of this hinge section may be adjustably swung from the slicing knives and also from the stationary slicing knife 69. To this end the support 65 is provided with a lug 66 and an adjusting screw 67 for effecting this adjustment. The opposite or left hand edge of the inner wall of the casing 24 is provided with a horizontal projection or shelf 68 to which a slicing knife 69 is fixed, see Figure 4. The knife is mounted in a suitable slot in the knife holder through the agency of a suitable fastening means. The lower face 70 of the knife support or shelf 68 provides one side of a guideway which in cooperation with a parallel face 72a of a guide surface of the stationary guideway hereinafter described forms another portion of the guideway for the slice being formed.

The improved arcuate sector 62 is hinged as before described to the peripheral wall of the casing member by the hinge pin 60, and is held in desired adjusted position by the thumb screw 67. Two narrow arcuate members 62b and 62c are pivoted on each side of this arcuate member 62 by means of screws 62g. These narrow arcuate members 62b and 62c are positioned in alignment with the side walls of the rotating drum 22 as shown more clearly in Figure 6 of the drawings. A bracket 62d held to the arcuate section by the screw 62e has overlying projections 62h which extend upwardly against the sides of these narrow arcuate sections 62b and 62c, and retain and guide said arcuate sections in their proper adjusted positions. Adjustment screws 62f are threaded in the bracket 62d to adjust these narrow arcuate sections to their proper position relative to the periphery of the side walls of the rotating drum. To adjust these improved arcuate sections the arcuate section 62 is first moved by the thumb screw 67 to obtain a slice of the proper thickness and thereafter when this fitting is secured, the narrow arcuate sections 62a and 62b are next adjusted by the screw 62f so that the inner curved surfaces of these narrow arcuate sections lie in close proximity to the innermost peripheries 23 of the side walls of the rotating drum 22. Thus means is provided whereby the vegetables and fruits are retained in proper position within the rotating drum and whereby any waste of the product through crushing or escaping from the machine without proper dicing is eliminated. These arcuate sections provide means whereby the space between the arcuate portion and the periphery of the rotating drum is maintained at all times to proper running clearance of minimum size, regardless of the thickness of the slice.

Referring particularly to Figures 4 and 5, the shear plate 76a has slots 80a through which the disc knives 36 are adapted to pass. In addition, this shear plate has a slice guiding portion 72 which extends over the axis of the disc knives 36 to a point relatively close or adjacent to the lower end 64 of the arcuate section 62 whereby to provide an unbroken or continuous guideway formed to direct the slice in its proper path from the lower edge of the arcuate section 64 as the slice is formed by the slicing knife 69, thence across the inner edge 74a of the shear plate and thence through the rotating disc knives 36. This slice guiding surface extends closely adjacent the periphery of the rotatable dice cutters 14 which rotate about the fixed axis 13. When vegetables such as onions or cabbages are sliced, this continuous guideway 72 supports the slice at all times and prevents the slice from separating into segments before passing through the disc knives, thus producing more uniformity in the cut vegetables. In addition, the extended guide 72a of the shear plate prevents any of the vegetables from wedging between the shear plate and the hub of the disc knives which would cause the stoppage of the machine.

It is thought that the invention and numerous of its attendant advantages will be understood from the foregoing illustrative description and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

Having thus described the invention, what we claim as new and desire to secure by Letters Patent is:

1. In a machine of the class described, in combination with a cylindrical casing adapted to contain a quantity of material to be sliced, a drum adapted to rotate within said casing to centrifuge the material against the inner wall of said casing, a portion of the periphery of said casing having a shiftable arcuate sector adapted adjustably to shift relatively to the remaining portion of the inner wall of said casing, means for so adjusting said sector, means for stationarily mounting a slicing knife opposite to and facing the outer free end of said arcuately swingable portion of said casing whereby upon centrifuging said material to slice a section from the material, and means cooperating with said adjustably shiftable casing sector and adjustable relatively thereto and the peripheral walls of said drum whereby the space between said arcuate portion and the periphery of the rotating drum is maintained at all times to proper running clearance regardless of the thickness of the slice said means preventing the lateral discharge of material from the opening between the drum and the side walls of the sector.

2. In a device of the class described, in combination with a cylindrical casing, a drum rotatably mounted to rotate at high speed within said casing, the inner peripheral walls of said casing being smooth, a portion of said walls being formed as an arcuately swingable sector, means for adjusting the position of said sector relative to the inner walls of said casing whereby to adjust the opening therebetween, a stationary slicing knife mounted at said opening in position to form a slice from the material being centrifuged in said casing by said drum, and means adjustably carried by said arcuately swingable sector and shiftable relatively thereto for substantially closing the space between the side walls of said arcuately swingable sector and the inner side walls of the drum while maintaining a running clearance therebetween whereby to permit the discharge of the formed slice from said casing while at the same time preventing the discharge of any of said material laterally of said rotating drum and said arcuately swingable sector.

3. In a device of the class described, in combination with a cylindrical casing a drum rotatable at high speed within said casing, said drum having radially extending spaced apart flanges on its periphery, and means disposed between said flanges for centrifuging material against the inner smooth wall of said drum, a portion of the peripheral wall of said drum being formed as an arcuately swingable sector adjustable outwardly of the remaining wall of said casing to provide a slot for the discharge of a slice, a slicing knife mounted in the wall of said casing directly opposite said arcuately swingable sector to cut a slice from the material centrifuged along the inner wall of said casing, and arcuate strips pivotally mounted on said arcuately swingable sector and adjustable toward the peripheral flanges of said drum to substantially close the space therebetween to prevent the discharge of material therebetween while maintaining running clearance between said rotating drum and said arcuately swingable sector.

4. In a device of the class described, in combination with a cylindrical casing having a smooth inner periphery, a drum rotating at high speed within said casing to centrifuge material along the inner smooth wall of said drum, said drum having peripheral flanges and means for centrifuging the substance within the casing and along its inner smooth wall, said smooth wall having an opening and having an arcuately swingable sector forming a portion of said walls, means for adjusting the sector outwardly to provide a slot of varying width, a knife blade mounted at the mouth of the slot to cut a slice from the commodity being centrifuged whereby to cause the discharge of said slice between the knife and the adjustable sector, and guide means adjustably mounted on and relatively to said sector and adapted to be positioned between the walls of said adjustable sector and the peripheral edges of said drum for preventing the lateral discharge of material from between said sector and said rotating drum while permitting the free discharge of the cut slice.

5. In a device of the class described, in combination with a casing having parallel side walls and an arcuate end wall joining the same to form an inner continuous smooth surface, means rotatably disposed within the casing and adapted to centrifuge an object to be sliced along said smooth wall, said arcuate end wall having an elongated opening therein to provide a discharge aperture for a slice, a slice cutting means mounted in one end of said opening in position to cut a slice from the material being centrifuged and an arcuate closure for said opening having a cross section substantially corresponding to the cross section of said opening and hinged to said opening at the opposite end of said opening, means for adjusting the end of said arcuate closure opposite to its hinged end toward and from the end of the slot adjacent the slicing cutter, and means carried by and shiftable relatively to the longitudinal side walls of the closure adjustable independently of the adjustment of the closure and itself for substantially closing the space between the longitudinal side edges of the closure and the adjacent longitudinal edges of the opening in the casing irrespective of the adjustment of the closure relatively to the edges of the opening.

6. In a device of the class described, in combination with a casing having a cylindrical peripheral wall, a rotary drum mounted within the casing and adapted to centrifuge an object to be sliced against the inner smooth surface of said wall, said smooth wall having a longitudinal slot therein, an arcuate closure corresponding substantially to the cross sectional area of the slot having one end thereof hinged to one end of the opening and means for swingably adjusting the opposite end of said closure toward and from the opposite end of said opening, and a slicing knife disposed at said opposite end of said opening to cut a slice from the product being centrifuged, and adjustable arcuate closures pivotally mounted on the inner wall portions of said first mentioned closure and swingably adjustable relatively thereto and to the member rotating within said casing.

7. In a device of the class described, in combination with a casing having a cylindrical peripheral wall, a rotary drum mounted within the casing and adapted to centrifuge an object to be sliced against the inner smooth surface of said wall, said smooth wall having a longitudinal slot therein, an arcuate closure corresponding substantially to the cross sectional area of the slot having one end thereof hinged to one end of the opening and means for swingably adjusting the opposite end of said closure toward and from the opposite end of said opening, and a slicing knife disposed at said opposite end of said opening to cut a slice from the product being centrifuged, and arcuate, adjustable closure means mounted on the underside of said first mentioned closure and adjustable relatively thereto and relatively to said casing for compelling the sliced material to discharge only at the end of the opening and the end of the arcuate closure in various positions of adjustment of the sector.

WILLIAM E. URSCHEL.
JOE RICHARD URSCHEL.

REFERENCES CITED

The following references are of record in the file of this patent:

UNITED STATES PATENTS

| Number | Name | Date |
| --- | --- | --- |
| 2,195,879 | Urschel et al. | Apr. 2, 1940 |
| 1,710,421 | Jorgenson | Apr. 23, 1929 |
| 2,242,557 | Urschel et al. | May 20, 1941 |

FOREIGN PATENTS

| Number | Country | Date |
| --- | --- | --- |
| 523,146 | Germany | Apr. 20, 1931 |